(12) United States Patent
Le Roux et al.

(10) Patent No.: US 8,218,432 B2
(45) Date of Patent: Jul. 10, 2012

(54) ROUTING METHOD IN A LABEL SWITCHING NETWORK

(75) Inventors: Jean-Louis Le Roux, Lannion (FR); Bruno Decraene, Vanves (FR)

(73) Assignee: France Telecom, Paris (FR)

( * ) Notice: Subject to any disclaimer, the term of this patent is extended or adjusted under 35 U.S.C. 154(b) by 216 days.

(21) Appl. No.: 12/442,419

(22) PCT Filed: Sep. 24, 2007

(86) PCT No.: PCT/FR2007/051999
§ 371 (c)(1),
(2), (4) Date: Mar. 23, 2009

(87) PCT Pub. No.: WO2008/037917
PCT Pub. Date: Apr. 3, 2008

(65) Prior Publication Data
US 2010/0008222 A1    Jan. 14, 2010

(30) Foreign Application Priority Data
Sep. 25, 2006  (FR) ..................... 06 53926

(51) Int. Cl.
*H04L 12/28* (2006.01)
*G06F 11/00* (2006.01)
(52) U.S. Cl. ................. 370/221; 370/225; 370/400
(58) Field of Classification Search .......... 370/216, 370/227–228, 254, 351; 714/2, 4
See application file for complete search history.

(56) References Cited

U.S. PATENT DOCUMENTS

| | | | |
|---|---|---|---|
| 6,741,553 B1* | 5/2004 | Grenier | 370/218 |
| 7,058,845 B2* | 6/2006 | Fujita | 714/4.2 |
| 7,269,346 B1* | 9/2007 | Iyer et al. | 398/3 |
| 7,274,654 B2* | 9/2007 | Yang et al. | 370/217 |
| 7,428,209 B1* | 9/2008 | Roberts | 370/217 |
| 7,535,826 B1* | 5/2009 | Cole et al. | 370/218 |
| 7,599,286 B2* | 10/2009 | Bhogavilli et al. | 370/217 |
| 7,719,960 B2* | 5/2010 | Atlas et al. | 370/222 |
| 2002/0063916 A1* | 5/2002 | Chiu et al. | 359/110 |
| 2002/0172149 A1* | 11/2002 | Kinoshita et al. | 370/216 |
| 2003/0053414 A1* | 3/2003 | Akahane et al. | 370/216 |
| 2005/0066220 A1* | 3/2005 | Gale et al. | 714/4 |

(Continued)

FOREIGN PATENT DOCUMENTS

EP    1 318 648 A2    6/2003

(Continued)

OTHER PUBLICATIONS

S. De Cnodder et al., "Backup Record Route for Fast Reroute Techniques in RSVP-TE", IETF Standard-Working-Draft, Internet Engineering Task Force, IETF, CH. No. 1, May 2002, pp. 1-16.

(Continued)

*Primary Examiner* — Hassan Kizou
*Assistant Examiner* — Roberta A Shand
(74) *Attorney, Agent, or Firm* — Cozen O'Connor

(57) ABSTRACT

A head router (2) can be used for routing packets in a label-switching network (1), the packets initially being intended for a primary destination router (5). A request is sent to set up a primary path (8) between this head router (2) and the primary destination router (5) in the network (1), this request including a request to activate a back-up path (9) to a back-up destination router (7).

13 Claims, 3 Drawing Sheets

U.S. PATENT DOCUMENTS

| | | | |
|---|---|---|---|
| 2006/0045007 A1* | 3/2006 | Huck | 370/226 |
| 2006/0120366 A1* | 6/2006 | Jayasenan et al. | 370/389 |
| 2006/0153067 A1* | 7/2006 | Vasseur et al. | 370/217 |
| 2006/0256767 A1* | 11/2006 | Suzuki et al. | 370/351 |
| 2007/0036073 A1* | 2/2007 | Yamada et al. | 370/225 |
| 2007/0070909 A1* | 3/2007 | Reeve | 370/238 |

FOREIGN PATENT DOCUMENTS

EP      1 379 032 A1      1/2004

OTHER PUBLICATIONS

D. Awduche et al., "RSVP-TE: Extensions to RSVP for LSP Tunnels", IETF Standard, Internet Engineering Tesk Force, IETF, CH, Dec. 2002, pp. 1-62.

Shaoling Sun et al., "A mini-FRR (Fast-Rerouting) Mechanism for IP/MPLS Network", IETF Standard-Working-Draft, Internet Engineering Task Force, IETF, CH, Feb. 2005, pp. 1-10.

* cited by examiner

ROUTING METHOD IN A LABEL SWITCHING NETWORK

RELATED APPLICATIONS

This is a U.S. National Phase Application under 35 USC §371 of International Application PCT/FR2007/051999, filed on Sep. 24, 2007.

This application claims the priority of French application no. 06/53926 filed on Sep. 25, 2006, and the content of which is hereby incorporated by reference.

BACKGROUND OF THE INVENTION

The field of the invention is that of telecommunications, and more specifically that of IP/MPLS (Internet Protocol/Multi-Protocol Label Switching) core and collect networks.

The context of the invention is more particularly an IP/MPLS network whose border routers, also known as edge routers, are meshed by explicit MPLS paths.

Such explicit MPLS paths are known as MPLS Traffic Engineering Label Switched Paths (MPLS-TE LSP).

An MPLS-TE LSP is a connection that starts at a head router (also known as an Ingress router), passes through links and routers referred to as transit routers, and terminates at a destination router (also known as an Egress router).

These paths are set up by the Resource Reservation Protocol-Traffic Engineering (RSVP-TE) signaling protocol defined in the Internet Engineering Task Force (IETF) document Request For Comments (RFC) 3209.

This protocol routes and distributes labels and reserves resources along the path.

The MPLS-TE technology is not described here. For more information see the above document RFC 3209.

Services having high demand in terms of end-to-end availability require deterministic rerouting within less than 50 milliseconds in the event of link or node failure.

This applies in particular to voice over IP (VoIP) services and telemedicine services.

The invention is more particularly directed to a rerouting mechanism that can be activated in the event of failure of the destination router (Egress router) or failure of the connecting link between that destination router and the last transit router to which it is connected.

OBJECT AND SUMMARY OF THE INVENTION

To this end, a first aspect of the invention relates to a routing method that can be used in a head router for routing packets in a label-switching network, the packets initially being intended for a primary destination router.

This method includes a step of sending a request to set up a primary path between the head router and the primary destination router, this request including a request to set up a back-up path to a back-up destination router.

In a correlated way, the invention relates to a head router that can be used for routing packets in a label-switching network, the packets initially being intended for a primary destination router.

This head router includes means for sending a request to set up a primary path between the head router and the primary destination router in the network, this request including a request to set up a back-up path to a back-up destination router.

A second aspect of the invention relates to a routing method that can be used in a transit router for routing packets in a label-switching network, the packets initially being intended for a primary destination router.

This method includes a step of receiving a request to set up a primary path between a head router and the primary destination router in the network, this request including a request to activate a back-up path to a back-up destination router and, if the transit router is the penultimate router in the primary path:
- a step of sending this request to said primary destination router; and
- a step of sending a request to set up a back-up path having for its destination the back-up destination router, this request including an identifier of the primary destination router for which the back-up path must be set up and an identifier of the backed-up primary path.

Another aspect of the invention is directed to a transit router that can be used for routing packets in a label-switching network, the packets initially being intended for a primary destination router.

This transit router includes:
- means for receiving a request to set up a primary path between a head router and the primary destination router in the network, this request including a request to activate a back-up path to a back-up destination router;
- means for determining if it is the penultimate router in the primary path;
- means for sending this request to the primary destination router; and
- means for sending a request to set up a back-up path having for its destination the back-up destination router, this request including an identifier of the primary destination router for which the back-up path must be set up and an identifier of the backed-up primary path.

Thus, an aspect of the invention defines a new routing mechanism that protects the primary destination router.

In the event of failure of this primary destination router or the last primary link, the upstream transit router, that is to say the penultimate router of the primary path, switches the traffic to the back-up destination router.

In one particular embodiment of the invention, the back-up path to the back-up destination router is pre-installed in the switching table of the penultimate router on the primary path, which guarantees a deterministic rerouting time of less than 50 milliseconds.

In one particular embodiment, the set-up request further includes the partial or complete back-up path, namely the path between the transit router preceding the primary destination router in the primary path and the back-up destination router.

In one particular embodiment of the invention, for example when the paths are set up by the RSVP_TE signaling protocol, the routing method implemented by the transit router of the invention includes:
- a step of receiving in response to the request to set up a back-up path a reservation message including confirmation of the setting up of the back-up path;
- a step of receiving a reservation message including confirmation of the setting up of the primary path; and
- a step of sending to the head router a reservation message including confirmation of the configuration of the back-up path and an indication as to whether that path is activated or not.

This feature advantageously informs the head router that the back-up path has actually been set up.

In one particular embodiment of the invention the routing method implemented in the transit router of the invention includes:
- a step of configuring a switching table including two outputs for an input label corresponding to the primary path, namely:

a primary output pointing to the primary destination router; and a back-up output pointing to the back-up destination router;

a step of detecting a failure affecting communication with said primary destination router and, on detection of the failure:

a step of updating said switching table consisting in deactivating said primary output and activating the back-up output.

In one particular embodiment of the invention the routing method implemented in the transit router of the invention includes, on detection of the above-mentioned failure:

a step of sending the head router an error message for the primary path;

a step of sending the back-up destination router a message for setting up the back-up path; and a step of sending the head router a reservation message for the primary path, this message including a field including the path between the transit router and the back-up destination router;

these messages including an indication that the back-up path is activated.

In practice, the field including the path between the transit router and the back-up destination router can be a Record Route Object (RRO) of the RSVP protocol.

In a correlated way, in one particular embodiment the routing method implemented in a head router of the invention includes, on detection of a failure affecting communication with the primary destination router:

a step of receiving an error message for the primary path;

a step of receiving a reservation message for the primary path indicating activation of the back-up path and including a field including the back-up path between:

a transit router preceding the primary destination router in the primary path; and the back-up destination router; and on the expiry of a predetermined delay running from the reception of the reservation message:

a step of setting up a new primary path to the back-up destination router; and a step of eliminating the primary path.

In this particular embodiment, the primary path set up to the primary destination router is permanently replaced by the new primary path to the back-up destination router if the failure lasts longer than said predetermined delay.

In another embodiment, the routing method includes a step of reporting failure of the primary path to the routing protocols using the primary path.

This reporting can be effected by fixing the metric of the primary path at a maximum value.

In one particular embodiment the routing method implemented by the transit router includes:

a step of detecting the end of the failure;

a step of sending a message to the primary destination router to re-establish the signaling of the primary path; and a step of sending the head router a reservation message containing the path between the transit router and the primary destination router and an indication that the back-up path is de-activated.

This particular feature enables the use of a reversion mechanism, i.e. it enables switching the traffic to the repaired primary path.

In this embodiment, this reversion mechanism is used by the penultimate transit router on the primary path and the head router is not involved. It simply receives a reservation message indicating that the back-up mechanism is no longer active.

In another embodiment, reversion is effected by the head router, which establishes a new primary path to the primary destination router, possibly protected by a back-up destination router.

Then, if this has not been done already, the head router destroys the old primary path.

It should be recalled that re-optimization is an MPLS-TE operation of modifying the path of a connection.

This operation is triggered as soon as a better path exists (this can be as a result of a link repair or any other event), as known in the art. During this operation, both paths are set up but only one is active. They therefore share the resources, the bandwidth reserved being the greater of the two bandwidths of the two paths, not the sum of those bandwidths.

In one particular embodiment of the invention, on re-optimizing a primary path, the new primary path shares resources with the old and back-up primary paths in accordance with the "make-before-break" procedure defined in the document RFC 3209. A new back-up path is also set up and shares resources with the old primary and back-up paths. The primary path/back-up path association is effected by transporting the identifier of the primary path in the messages setting up the back-up path.

A back-up path can be re-optimized without re-optimizing the primary path. This operation can be triggered by the head router of the primary path or by the head router of the back-up path. The new back-up path then shares resources with the old back-up path.

In one particular embodiment, the steps of the above routing methods are determined by computer program instructions.

An aspect of the invention is directed to a computer program on an information medium, the program being adapted to be executed in a router, or more generally in a computer, and including instructions adapted to execute the steps of the above routing method.

This program can use any programming language and take the form of source code, object code or an intermediate code between source code and object code, such as a partially-compiled form, or any other desirable form.

An aspect of the invention is directed to a computer-readable information medium containing instructions of the above computer program.

The information medium can be any entity or device capable of storing the program. For example, the medium can include storage means, such as a ROM, for example a CD ROM or a microelectronic circuit ROM, or magnetic storage means, for example a diskette (floppy disk) or a hard disk.

Moreover, the information medium can be a transmissible medium such as an electrical or optical signal, which can be routed via an electrical or optical cable, by radio or by other means. The program of the invention can in particular be downloaded over an Internet-type network.

Alternatively, the information medium can be an integrated circuit in which the program is incorporated, the circuit being adapted to execute the method in question or to be used in its execution.

An aspect of the invention is directed to a signal carrying a request to set up a primary path between a head router and a primary destination router in order to route packets in a label-switching network, this request including a request to set up a back-up path to a back-up destination router.

BRIEF DESCRIPTION OF THE DRAWINGS

Other features and advantages of the present invention emerge from the description given below with reference to the appended drawings, which show one embodiment of the present invention by way of non-limiting example. In the figures.

DETAILED DESCRIPTION OF ONE EMBODIMENT

Figure 1:
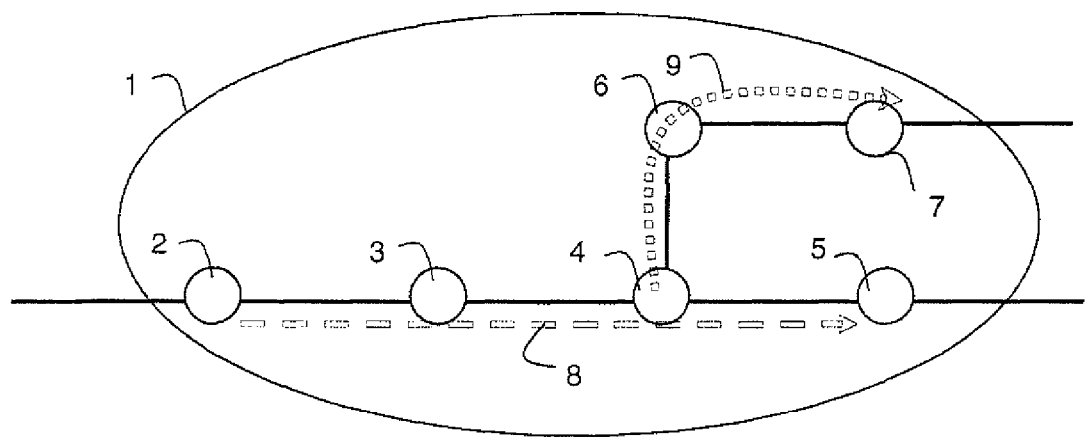
FIG. 1 represents a head router and a transit router of one particular embodiment of the invention.

FIG. 1 represents an MPLS-TE network 1.

This network includes a set of routers 2, 3, 4, 5, 6, 7 supporting the RSVP_TE protocol and between which RSVP_TE LSPs are set up according to the standard defined in the IETF Request For Comments document RFC 3209.

The primary MPLS-TE LSP 8 set up under the RSVP_TE II protocol has at its source the head router 2 of the invention and a primary destination router 5.

In FIG. 1, the back-up path 9 set up under the RSVP_TE II protocol has at its source the transit router 4, namely the penultimate router of the primary path, and at its destination the back-up destination router 7.

The router 3 is a transit router of the primary LSP 8.

The router 6 is a transit router of the back-up LSP 9.

Figure 2:
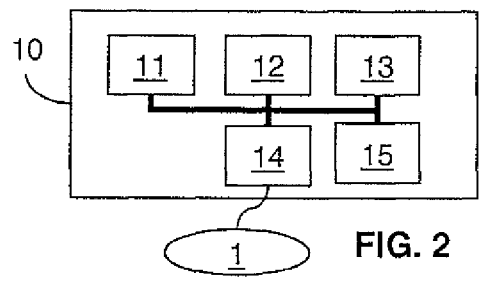
FIG. 2 represents the hardware architecture of a conventional computer.

In the example described here, the hardware architecture of the head router 2 and that of the transit router 4 of the invention are the same as that of a conventional computer 10 represented in FIG. 2.

That conventional computer 10 includes a processor 11, a hard disk 12, a random-access memory (RAM) 13, and means 14 for communicating with the MPLS-TE network 1.

Figure 3:
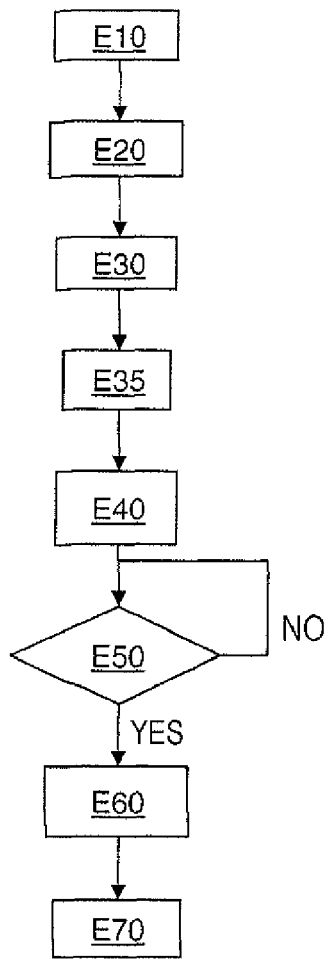
FIGS. 3 and 4 are respectively flowcharts of routing methods of the invention that can be implemented in a head router of the invention and in a transit router of the invention.

The hard disk 12 of the head router 2 of the invention contains a computer program of the invention including instructions for executing steps of the routing method including the main steps E10 to E70 shown in FIG. 3.

Figure 4:
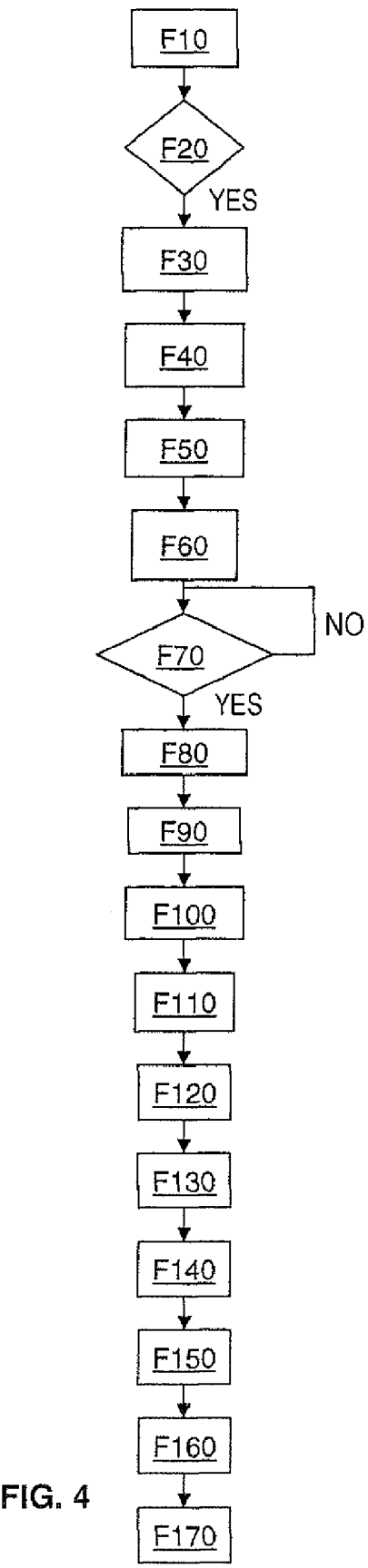

The hard disk 12 of the transit router 4 of the invention contains a computer program of the invention including instructions for executing the steps of the routing method including the main steps F10 to F170 shown in FIG. 4.

In the embodiment described here, the head router 2 and the transit router 4 of the invention include an MPLS switching table 15.

FIGS. 3 and 4 are described below.

During a first step E10, the head router 2 of the invention sends an RSVP_TE Path message to set up a primary path 8 in the MPLS-TE network 1.

In the embodiment described here, this message includes:
  a request to set up a back-up mechanism; and
  the IP address of the back-up destination router 7.

In the particular embodiment described here, the set-up request is encoded in a new bit (Attribute Flags) of the TLV transported in the RSVP "LSP_Attribute" object defined in IETF Request for Comments RFC 4420.

In the particular embodiment described here, the IP address of the back-up destination router 7 is encoded in a new RSVP "Backup_Egress" object.

The RSVP_TE Path message optionally also includes the back-up path 9 between the transit router 4 of the invention and the back-up destination router 7.

This path can be encoded in the RSVP "SERO" object defined by Berger, Bryskin, Papadimitriou, Farrel, in "GMPLS Segment Recovery", http://www.ietf.org/internet-drafts/draft-ietf-ccamp-gmpls-segment-recovery-02.txt.

The transit router 4 of the invention receives this RSVP-TE Path message during a step F10 of the routing method of the invention implemented by the router 4.

During a step F20, the transit router 4 of the invention verifies if it is the penultimate router in the primary path 8.

In practice, it calculates the number of hops that separate it from the primary destination router 5 and determines that it is the penultimate router when this number of hops is equal to 1.

If the transit router 4 determines that it is not the penultimate router, it transmits the RSVP_TE Path message downstream using the RSVP-TE procedures defined in RFC 3209.

If the transit router 4 is the penultimate router in the primary path 8, the verification step F20 is followed by a step F30 during which the transit router 4 forwards the RSVP_TE Path message received in the step F10 to the primary destination router 5.

This transmission step F30 is followed by a step F40 in which the transit router 4 sends a RSVP_TE Path message to set up the back-up path 9 to the back-up destination router 7 with the IP address contained in the RSVP_TE Path message for setting up the primary path.

The RSVP_TE Path message for setting up the primary path 9 includes:
  an indication that this message sets up a back-up path 9;
  the IP address of the backed-up primary destination router 5; and
  the identifier of the primary path 8.

In the embodiment described here, the identifier of the primary path is transported in a new "Primary LSP" object of the RSVP_TE Path message. Its value consists of the concatenated Session and Sender-Template objects of the protected primary path. The indication that this message sets up a back-up path is transported in a new bit (Attribute Flags) of the TLV transported in the RSVP "LSP_Attribute" object defined above. The IP address of the backed-up primary destination router is transported in a new RSVP "Primary Egress" object.

On reception of an RSVP_TE Resv message for this RSVP_TE Path message, indicating that the back-up path 9 has been set up, and of an RSVP_TE Resv message for the RSVP_TE Path message sent to the primary destination router 5, indicating that the primary path 8 has been set up, the transit router 4 sends a RSVP_TE Resv message to the head router 2 for the primary path 8 in a step F50, this message indicating that the back-up mechanism has been set up on the transit router 4.

In the embodiment described here, this indication can be encoded in a new attribute bit of the "RRO Attributes" sub-object of the RSVP "RRO" object defined in IETF Request For Comments RFC 4420.

In the embodiment described here, the RSVP_TE RESV reservation message sent by the transit router 4 includes an indication of whether the back-up path is active or not. This indication is encoded in a new attribute bit of the "RRO Attribute" sub-object.

This RSVP_TE Resv message is received by the head router 2 during a step E20 of its routing method.

During a step F60, the transit router 4 of the invention configures its MPLS switching table 15. To be more precise, it maintains in this table 15 two outputs for the MPLS input label corresponding to the primary path 8, namely:
  a primary output pointing to the primary destination router 5; and a back-up output pointing on the back-up path to the back-up destination router 7.

In the primary regime, the back-up output is inactive.

It is assumed now that in a step F70 the transit router 4 detects failure of the last primary link or the primary destination router 5.

This detection can be effected by a level 2 (for example SDH alarm) mechanism or a level 3 (for example BFD (Bidirectional Forwarding Detection)) mechanism—see http://www.ietf.org/internet-drafts/draft-ietf-bfd-base-05.txt.

On detection of the failure, the transit router 4 of the invention immediately updates its MPLS switching table during a step F80 so that the primary output is de-activated and the back-up output is activated.

The traffic is then switched to the back-up path 9 to the back-up destination router 7.

In parallel with this, the transit router 4 sends the head router 2 an RSVP_TE PathErr message for the primary path 8 during a step F90 with the error code signifying "Notification, protection of the activated destination".

The head router 2 receives this RSVP_TE PathErr message during a step E30 of its routing method.

Then, during a step F100, the transit router 4 sends the back-up destination router 7 an RSVP_TE Path message for setting up the back-up path 9. This message includes the indication of activation of the back-up mechanism. In the embodiment described here, the indication is encoded in a new bit "Attribute Flags" of the TLV transported in the RSVP "LSP_Attribute" object referred to above.

Then, during a step F110, the transit router 4 sends the head router 2 an RSVP_TE Resv message for the primary path 8 with a modified RRO containing the path between the transit router 4 and the back-up destination router 7. This message also includes the indication of activation of the back-up mechanism.

The head router 2 receives this RSVP_TE Resv message during a step E35 of its routing method.

In the transit router 4, the counter that counts refreshing of the RSVP Resv state by the primary destination router 5 of the primary path 8 is disarmed and the transit router 4 functions as if it continued to receive Resv refreshes of the primary destination router 5.

It continues to refresh the upstream RSVP Resv state. The Resv refreshes of the back-up path 9 can refresh the Resv states of the primary path 8.

Following the failure, the router 2 of the invention has received, as already described:
  during the step E30, the RSVP_TE PathErr message with the error code signifying "Activated destination protection notification"; and
  during the step E35, an RSVP_TE Resv message indicating that the back-up mechanism has been triggered with a modified RRO including the path between the transit router 4 and the back-up destination router 7.

On reception of this message, the head router 2 triggers a counter (step E40) initialized with a predetermined delay and continues to use the primary path to route traffic.

During a test E50, the head router 2 waits for the above-mentioned predetermined delay to expire.

On expiry of that delay, the result of the test E50 is positive.

In an alternative embodiment that is not described, the head router 2 then notifies the routing protocols using the primary path 8 of the failure, positioning the metric of that path to a maximum value.

In the example described here, on expiry of the delay, the head router 2 sets up a new primary path to the back-up destination router 7 (step E60) and then eliminates the impacted primary path 8 during a step E70.

In practice, to eliminate the primary path, the head router 2 sends an RSVP_TE PathTear message as defined in the document RFC 3209.

The RSVP_TE PathTear message is received by the transit router 4 of the invention during a step F120, and eliminates the back-up path 9, sending an RSVP_TE PathTear message for the back-up path 9.

In the embodiment described here, when the failure of the primary destination router 5 or the link is repaired, reversion, i.e. switching the traffic to the repaired path, can be effected in two ways:
  either by the transit router 4 of the invention, in which case the head router 2 is not involved: the head router 2 then receives an RSVP_TE Resv message indicating that the back-up mechanism has not been triggered;
  or by the head router 2, which sets up a new primary path to the primary destination router 5, possibly protected by a back-up destination router 7.

Figure 5:
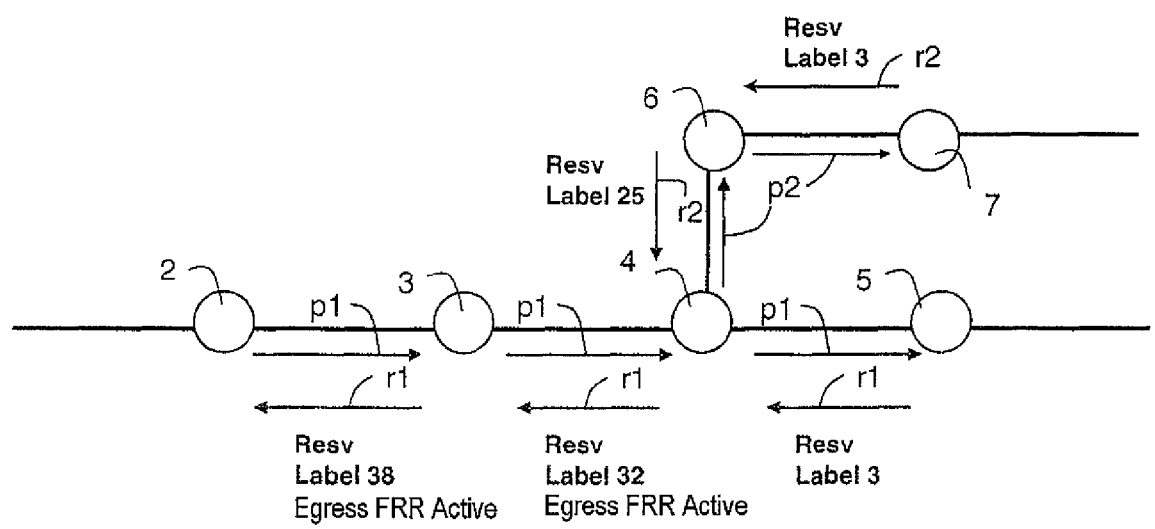
FIG. 5 represents an example of primary and back-up path signaling in one embodiment of the invention.
Figure 6:
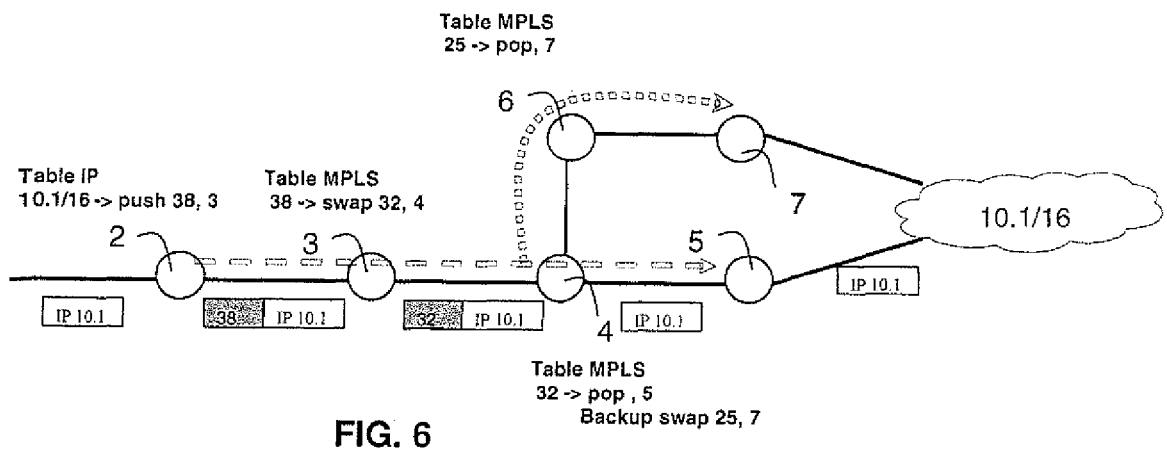
FIGS. 6 and 7 respectively represent the switching of packets in the FIG. 1 network before and after a failure.
Figure 7:
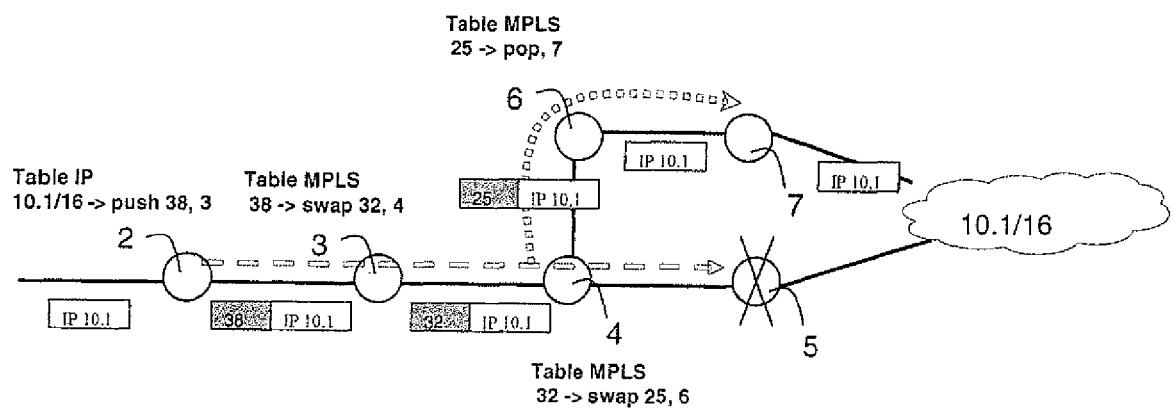

FIGS. 5, 6, and 7 show, by way of example, the setting up a primary path from the head router 2 to the primary destination router 5 with protection provided in accordance with the invention by the back-up destination router 7.

The transit router of the invention is the router 4.

The primary path 8 is configured by the operator in the head router 2 directly or via a manager.

The configuration includes, in addition to the standard MPLS-TE parameters:
  the request to set up the back-up mechanism of the invention; and
  the IP address of the back-up destination router 7.

The head router 2 calculates a primary path and a back-up path conforming to the restraints (bandwidth, affinities, etc.) and then launches RSVP_TE signaling, sending a Path message P1 containing, in addition to the standard RSVP objects, the request to set up a back-up mechanism of the invention, the IP address of the back-up destination router 7, and the back-up path (4-6-7):
  P1
  Primary destination 5
  Head 2, tunnel_id=1, LSP_id=8
  Attribute: Back-up set-up request
  Back-up destination 7
  ERO 3-4-5
  SERO Back-up path 4-6-7

On reception of this RSVP_TE Path message P1, the transit router 4 detects that it is the penultimate router of the primary path 8 by analyzing the number of hops between it and the primary destination router 5.

It therefore triggers the setting up of a back-up path 9 to the back-up destination router 7. To this end, it generates an RSVP_TE Path message P2 corresponding to the above-mentioned back-up route (i.e. 6-7):
  P2
  Destination 7
  Head 4, tunnel_id=5, LSP_id=9
  Attribute: Back-up LSP
  Protected LSP: Ingress 2, tunnel_id=1, LSP_id=8
  ERO 6-7

On reception of the RSVP_TE Resv messages R1 and R2 for the primary and back-up paths, respectively, the transit router 4 sends an RSVP_TE Resv message to the head router 2 indicating that the back-up mechanism of the invention has been set up.

FIG. 6 indicates the content of the IP and MPLS tables of the routers 2, 3, 4, and 6 before the failure of the destination router 5 and the routing of the IP/MPLS packets to a destination with a prefix 10.1/16 that can be reached via the primary destination router 5 and the back-up destination router 7.

The MPLS table of the transit router 4 contains two outputs for the input label of the primary path 8:
- the primary output to the primary destination (POP) router 5, 7; and
- a back-up output pointing to the back-up (SWAP) router 25, 7.

Using this notation, the first number "25" is the label and the second number "7" is the number of the downstream router.

FIG. 7 indicates the content of the IP and MPLS tables of the routers and the routing of packets during the failure.

The transit router 4 redirects the packets onto the back-up path 9 towards the back-up router 6 which in turn routes the packets to their destination.

It is assumed below that, during a step F130, the transit router 4 detects that the failure affecting the primary destination router 5 has been repaired.

During a step F140, the transit router 4 sends an RSVP_TE Path message to the primary destination router to re-establish signaling on the primary path 8.

Then, during a step F150, the transit router 4 updates its MPLS switching table so that the primary output is activated and the back-up output is deactivated to re-route the traffic toward the primary destination router 5.

Then, during a step F160, the transit router 4 sends the head router 2 an RSVP_TE Resv message with a modified RRO containing the path between the transit router 4 and the primary destination router 5 and indicating that protection has been set up but not activated.

Then, during a step F170, the transit router 4 sends the back-up destination router 7 an RSVP_TE Path message including the indication of deactivation of the back-up mechanism.

The invention applies equally if the primary path 8 includes only one hop. In this situation, the head router 2 is the penultimate router on the primary path, which includes no transit router 4.

The invention claimed is:

1. A routing method that can be used in a head router for routing packets in a label-switching network, the packets initially being intended for a primary destination router, said method including a step for sending a primary path set up request to set up a primary path between said head router and said primary destination router in said network, wherein said primary path set up request includes a back-up path set up request to set up a back-up path to a back-up destination router, wherein said back-up path set up request is intended for the penultimate router of the primary path, and wherein the penultimate router of the primary path is a source of the back-up path and sets up the backup path.

2. The routing method according to claim 1, wherein said set-up request further includes the partial or complete back-up path, namely the path between the transit router preceding said primary destination router in the primary path and said back-up destination router.

3. The routing method according to claim 1, comprising, on detection of a failure affecting communication with said primary destination router:
   - a step of receiving an error message for said primary path indicating activation of the back-up path;
   - a step of receiving a reservation message for said primary path indicating activation of the back-up path and including a field including a back-up path between:
     (i) a transit router preceding said primary destination router in said primary path; and
     (ii) said back-up destination router; and on the expiry of a predetermined delay running from the reception of said reservation message:
   (i) a step of setting up a new primary path to said back-up destination router; and
   (ii) a step of eliminating said primary path.

4. A non-transitory computer-readable storage medium on which is stored a computer program including instructions for executing the steps of a routing method according to claim 1.

5. A routing method that can be used in a transit router for routing packets in a label-switching network, the packets initially being intended for a primary destination router, said method comprising:
   - a step of receiving a request to set up a primary path between a head router and said primary destination router in said network, wherein said request includes a request to activate a back-up path to a back-up destination router; and
   - a step of determining if the transit router is the penultimate router in the primary path,
   wherein if said transit router is the penultimate router in said primary path, the method further comprises:
   - a step of sending said request to said primary destination router; and
   - a step of sending a request to set up a back-up path having the penultimate router of the primary path as a source and having said back-up destination router as a destination, this request including an identifier of said primary destination router for which the back-up path is set up and an identifier of said backed-up primary path.

6. The routing method according to claim 5, comprising:
   - a step of receiving in response to said request to set up a back-up path a reservation message including confirmation of the setting up of said back-up path;
   - a step of receiving a reservation message including confirmation of the setting up of the primary path; and
   - a step of sending to said head router a reservation message including confirmation of the setting up of said back-up path and an indication as to whether that path is activated or not.

7. The routing method according to claim 5, comprising:
   - a step of configuring a switching table including two outputs for an input label corresponding to said primary path, namely:
     (i) a primary output pointing to said primary destination router; and
     (ii) a back-up output pointing to the back-up path to said back-up destination router;
   - a step of detecting a failure affecting communication with said primary destination router and, on detection of said failure:
   - a step of updating said switching table including deactivating said primary output and activating said back-up output.

8. The routing method according to claim 7, comprising, on detection of said failure:
   - a step of sending said head router an error message for said primary path;
   - a step of sending said back-up destination router a message for setting up said back-up path; and
   - a step of sending said head router a reservation message for said primary path, this message including a field including the path between said transit router and said back-up destination router;
   these messages including an indication that said back-up path is activated.

9. The routing method according to claim 5, comprising:
   a step of detecting the end of said failure;
   a step of sending a message to said primary destination router to re-establish the signaling of said primary path; and a step of sending said head router a reservation message containing the path between the transit router and the primary destination router and an indication that said back-up path is deactivated.

10. A computer program stored in a computer memory and executing on a processor which, when used on a computer, causes set up of a primary path between a head router and a primary destination router for routing packets in a label-switching network, the set up comprising: sending a primary path set up request to set up a primary path between said head router and said primary destination router in said network, wherein said primary path set up request includes a back-up path set up request to set up a back-up path to a back-up destination router, wherein said back-up path set up request is intended to the penultimate router of the primary path, and wherein the penultimate router of the primary path is a source of the back-up path and sets up the backup path.

11. A head router that can be used for routing packets in a label-switching network, the packets initially being intended for a primary destination router, said router including means for sending a primary path set up request to set up a primary path between said head router and said primary destination router in said network, wherein said primary path set up request includes a back-up path set up request to activate a back-up path to a back-up destination router, wherein said back-up path set up request is intended for the penultimate router of the primary path, and wherein the penultimate router of the primary path is a source of the back-up path and sets up the backup path.

12. A transit router that can be used for routing packets in a label-switching network, the packets initially being intended for a primary destination router, said router comprising:
    means for receiving a request to set up a primary path between a head router and said primary destination router in said network, wherein said request includes a request for activation of a back-up path to a back-up destination router;
    means for determining if the transit router is the penultimate router in said primary path;
    means for sending said request to said primary destination router if the transit router is the penultimate router in the primary path; and
    means for sending a request, if the transit router is the penultimate router in the primary path, to set up a back-up path having the penultimate router of the primary path as a source and having said back-up destination router as a destination, this request including an identifier of said primary destination router for which the back-up path is set up and an identifier of the backed-up primary path.

13. A routing method that can be used in a head router for routing packets in a label-switching network, the packets initially being intended for a primary destination router, said method including a step for sending a request to set up a primary path between said head router and said primary destination router in said network, wherein said request includes a request to set up a back-up path to a back-up destination router,
    the routing method further comprising, on detection of a failure affecting communication with said primary destination router:
    a step of receiving an error message for said primary path indicating activation of the back-up path;
    a step of receiving a reservation message for said primary path indicating activation of the back-up path and including a field including a back-up path between:
    (i) the transit router preceding said primary destination router in said primary path; and
    (ii) said back-up destination router; and
    on the expiry of a predetermined delay running from the reception of said reservation message:
    (i) a step of setting up a new primary path to said back-up destination router; and
    (ii) a step of eliminating said primary path.

* * * * *